Figure 1:
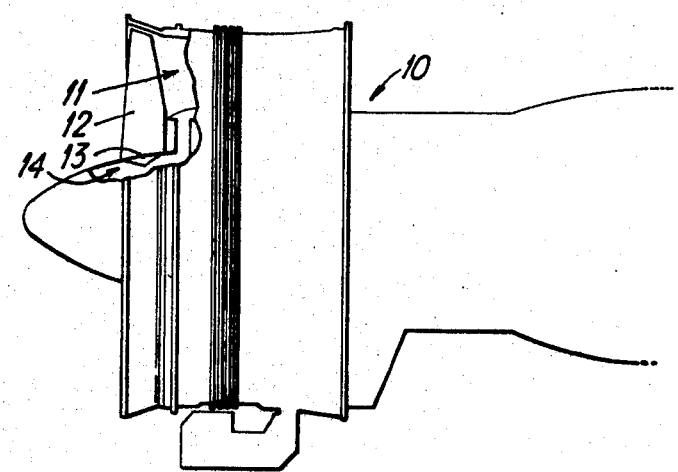

United States Patent [19]

Goodwin

[11] 3,712,757

[45] Jan. 23, 1973

[54] BLADED ROTORS FOR FLUID FLOW MACHINES

[75] Inventor: John Robert Goodwin, Ockbrook, England

[73] Assignee: The Secretary of State For Defence, in Her Britannic Majesty's Government of the United Kingdom of Great Britain and Northern Ireland, London, England

[22] Filed: Jan. 7, 1972

[21] Appl. No.: 216,104

Related U.S. Application Data

[63] Continuation-in-part of Ser. No. 82,350, Oct. 20, 1970, abandoned.

[52] U.S. Cl. ..............................................416/245
[51] Int. Cl. ...............................................B64c 11/14
[58] Field of Search.............................416/244, 246

[56] References Cited

UNITED STATES PATENTS 2,780,297   2/1957   Barish..........................416/245

FOREIGN PATENTS OR APPLICATIONS

| | | | |
|---|---|---|---|
| 877,144 | 9/1942 | France | 416/245 |
| 1,164,059 | 5/1958 | France | 416/245 |
| 566,427 | 12/1944 | Great Britain | 416/245 |
| 681,859 | 10/1952 | Great Britain | 416/245 |
| 403,137 | 4/1943 | Italy | 416/245 |

Primary Examiner—Everette A. Powell, Jr.
Attorney—Cushman, Darby & Cushman

[57] ABSTRACT

A part-annular spacer adapted to form part of a hub of a bladed rotor of fluid flow machine and to be interposed between adjacent blades of the rotor so as to space the blades apart. The spacer has axially opposite ends and comprises radially inner and outer circumferentially extending wall members and substantially radially extending wall means. The blades of said rotor are provided with substantially axially extending sealing means on the portions thereof adjacent the radial extents of each of said radial wall means on each of said spacers. The radially inner and outer circumferentially extending wall members are disposed adjacent to and secured to each other at the axially opposite ends of the spacer and are spaced from each other intermediate said ends. The substantially radially extending wall means being maintained in tension and extending radially between and secured to the circumferentially extending wall members so as to brace the latter together. The radial extents of each of said radial wall means are adapted to cooperate in sealing relationship with said sealing means provided on said blades.

11 Claims, 4 Drawing Figures

PATENTED JAN 23 1973

3,712,757

SHEET 1 OF 2

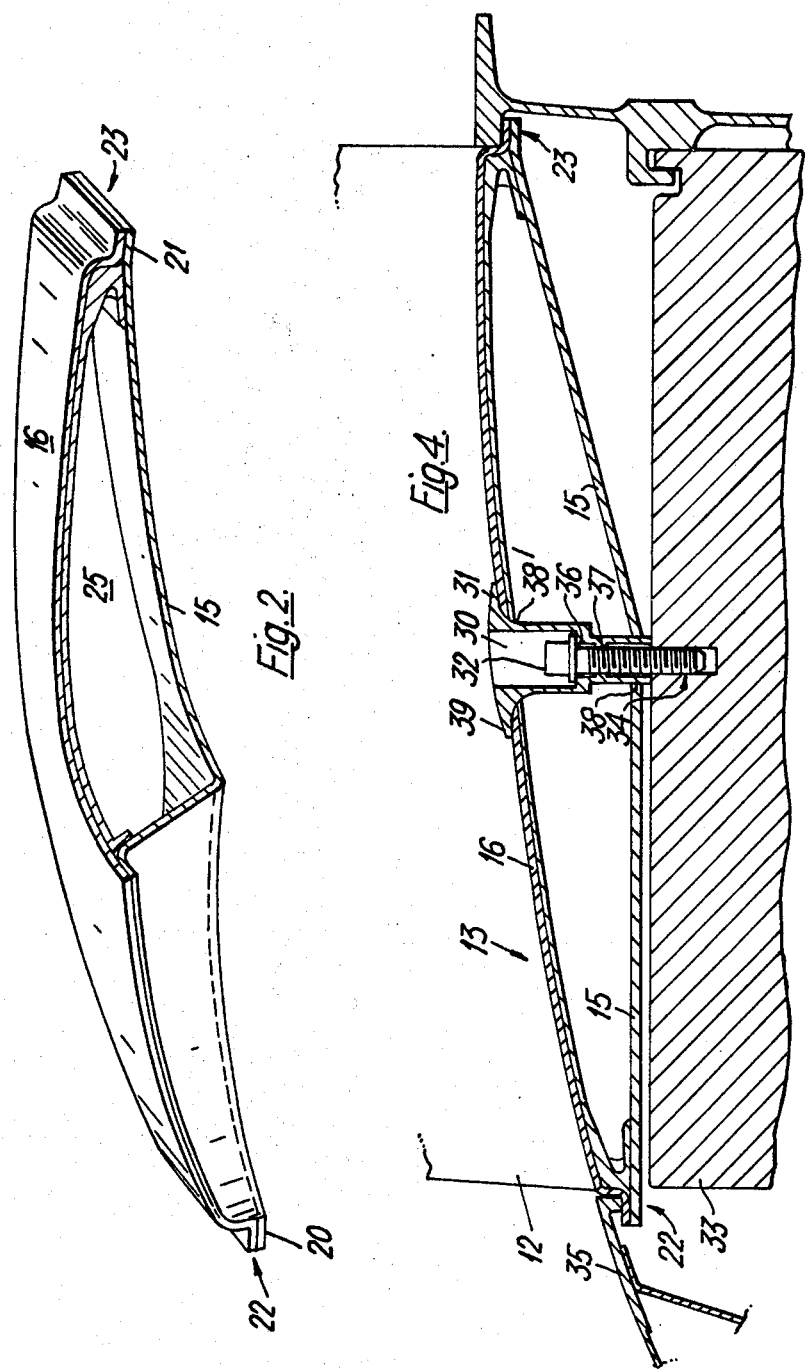

ized sealing strips fixedly attached to each of
BLADED ROTORS FOR FLUID FLOW MACHINES This application is a continuation-in-part application of my copending application Ser. No. 82,350 filed Oct. 20, 1970 now abandoned.

This invention concerns improvements in or relating to bladed rotors for fluid flow machines such, for example, as gas turbine engines.

It is known to space apart the blades of such a rotor by part-annular spacers which form part of the hub of the rotor, but such spacers are liable to break under the high centrifugal loads to which they are subjected in operation. The present invention seeks to overcome this drawback.

According to the present invention, there is provided a part-annular spacer adapted to form part of a hub of a bladed rotor of a fluid flow machine and to be interposed between adjacent blades of the rotor so as to space the blades apart, the spacer comprising radially inner and outer circumferentially extending wall members which are disposed adjacent to and are secured to each other at the axially opposite ends of the spacer and are spaced from each other intermediate said ends, and substantially radially extending wall means which are maintained in tension and which extend radially between and are secured to the circumferentially extending wall members so as to brace the latter together, said substantially radially extending wall means being adapted at their radial extents to co-operate in sealing relationship with sealing means provided on the portions of said blades adjacent thereto.

The bracing effected by the radially extending wall means reduces the tendency of the spacer to break under the high centrifugal loads referred to above.

Preferably each of said radially extending wall means are outwardly curved in a generally circumferential direction so as to form substantially axially extending flanges, which flanges co-operate in sealing engagement with substantially T-shaped cross-section elastomeric sealing strips fixedly attached to each of said blades.

Preferably, the substantially radially extending wall means extend to the said axially opposite ends of the spacer. Thus the substantially radially extending wall means may comprise two angularly spaced apart substantially radially extending wall members each of which extends to both ends of the spacer. The radially extending wall members may be circumferentially spaced apart between the axially opposite ends of the spacer.

The circumferentially extending wall members are preferably formed, at least in part, of material whose tensile strength is substantially greater than that of the radially extending wall means.

Thus the radially extending wall means may be formed of a first material, and the circumferentially extending wall members is formed of alternate layers of said first material and of a second material whose tensile strength is greater than the first material. The first material may be a glass-reinforced plastics material, the second material being a carbonaceous material. The spacer preferably has an aperture within which there may be disposed a retaining member adapted to be received by disc structure of the fluid flow machine whereby the spacer may be connected to said disc structure. Both said radially inner and radially outer wall members may be apertured, a generally tubular member being mounted in the apertures in said wall members, said generally tubular member having a bore provided with abutment means adapted to abut said retaining member. Said radially outer wall may be retained against radially outward movement by flange means on said generally tubular member.

Figure 3:
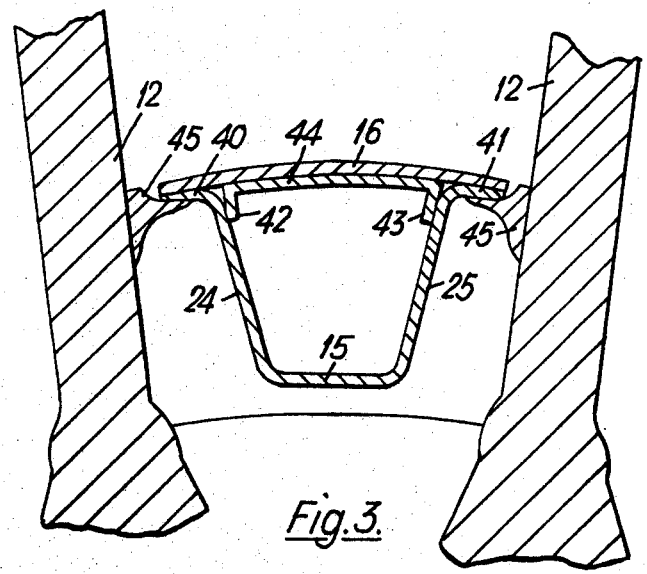

The invention is illustrated, merely by way of example, in the accompanying drawings, in which:

FIG. 1 is a broken away, part-sectional, elevation of a front fan gas turbine engine whose fan blades are spaced apart by part-annular spacers, and FIG. 2 is a partly sectioned perspective view of a part-annular spacer employed in the engine of FIG. 1, and FIG. 3 is a cross-sectional view of a part-annular spacer showing its relationship with the fan blades of the front fan gas turbine engine of FIG. 1, and FIG. 4 is an elevation view, in schematic part-section, of an arrangement whereby the spacer may be secured to disc structure of the hub.

In FIG. 1 there is shown a front fan gas turbine engine 10 whose front fan 11 has a rotor provided with fan rotor blades 12. Interposed between each adjacent pair of fan rotor blades 12 so as to space the latter apart is a part-annular spacer 13, the spacers 13 collectively forming an annular hub 14 (or at least a substantial part of the hub 14) of the rotor.

As shown in FIG. 2, each spacer 13 comprises radially inner and outer circumferentially extending wall members 15, 16. The wall members 15, 16 respectively have end portions 20, 21 which are disposed adjacent to and are secured to each other at the axially opposite ends 22, 23 of the spacer 13, the end portions 21 being somewhat enlarged. The wall members 15, 16 are however, spaced from each other intermediate the ends 22, 23.

Each spacer 13 is also provided with two angularly spaced apart substantially radially extending wall members 24, 25 each of which extends to both ends 22, 23 of the spacer 13. As can be seen in FIG. 3, wall members 24, 25 are integral with circumferentially extending wall member 15 so as to define a substantially U-shaped cross-section channel. The radially outer extents 40, 41 of wall members 24, 25 are outwardly curved in a generally circumferential direction so as to provide location flanges for wall member 16. Wall member 16 is supported by reinforcing member 44, the circumferentially spaced apart flanges 42, 43 of which are fixedly attached to wall members 24, 25 respectively. As can be seen from FIG. 2, reinforcing member 44 extends between both ends 22, 23 of spacer 13.

In addition to acting as supports for wall member 16, platforms 40, 41 co-operate with sealing strips 45 fixedly located on the aerofoil surfaces of fan blades 12. Sealing strips 45 are of substantially T-shaped cross-section and are made of an elastomer e.g., "Viton" a synthetic rubber manufactured by Du Pont de Nemours and Co. Sealing strips 45 are situated such that their sealing surfaces are urged into sealing contact with the radially inner faces of platforms 40, 41 by centrifugal force resulting from the rotation of fan blades 12 during engine operation. It will be appreciated that in order to provide a substantially continuous seal between spacer 13 and adjacent fan blades 12, spacer 13 must be of such axial configuration as to correspond with the aerofoil profile of fan blades 12.

Both the wall members 24, 25 are maintained in tension and extend radially between and are secured to the wall members 15, 16 so as to brace the latter together.

The wall members 24, 25 and reinforcing member 44 may be formed of a glass reinforced plastics material, such as an epoxy resin, while each of the wall members 15, 16 may be formed of alternate layers (not shown) of the said glass reinforced plastics material and of a carbonaceous material having a substantially higher tensile strength than the glass reinforced plastics material. The carbonaceous material, may for example, be formed by a process comprising oxidizing and graphitizing polyacrylonitrile, and may be that known under the British Registered Trade Mark "Hyfil."

As will be appreciated, the centrifugal loading to which the wall member 16 is subjected will, in operation, be substantially greater than that to which the wall member 15 will be subjected. The bracing provided by the wall members 24, 25 in conjunction with the materials employed, will however reduce the risk of the spacer 13 breaking under such centrifugal loading.

FIG. 3 shows an arrangement whereby the spacers may be secured to the disc structure. Apertures 38, 38' are provided in the inner and outer walls 15, 16 respectively, the center of the outer aperture 38' being substantially radially spaced from the center of the inner aperture 38. The position of the aperture 38 in wall 15 is substantially equidistant from the ends 22, 23 of the spacer. A generally tubular mushroom-shaped member 31 is provided with an axial bore 30 and passes through both apertures 38, 38', the member 31 being bonded in place and the radially inner end (when assembled) being machined to conform with the disc structure 33 of the hub. A flange part 39 of the member 31 assists in retaining the spacer against radially outward movement.

A screw-threaded hole 34 is tapped in the required position on the disc structure 33 and receives a threaded bolt or retaining member 32. The bore 30 in the member 31 is provided with abutment means comprising shoulders 36 and a screw-threaded portion 37 which engage respectively with a head of the bolt 32 and with a screw-thread thereon.

As will be seen, a blade 12 is circumferentially adjacent the spacer 13, which at its axially upstream end fits into a nose cone assembly 35.

I claim:

1. A part-annular spacer adapted to form part of a hub of a bladed rotor of a fluid flow machine and to be interposed between adjacent blades of the rotor so as to space the blades apart, the spacer having axially opposite ends and comprising radially inner and outer circumferentially extending wall members and substantially radially extending wall means, the blades of said rotor being provided with substantially axially extending sealing means on the portions thereof adjacent the radial extents of each of said radial wall means on each of said spacers, said radially inner and outer circumferentially extending wall members being disposed adjacent to and being secured to each other at the axially opposite ends of the spacer and being spaced from each other intermediate said ends, said substantially radially extending wall means being maintained in tension and extending radially between and being secured to the circumferentially extending wall members so as to brace the latter together, said radial extents of each of said radial wall means being adapted to cooperate in sealing relationship with said sealing means provided on said blades.

2. A spacer as claimed in claim 1 in which each of said radially extending wall means are outwardly curved in a generally circumferential direction so as to form substantially axially extending flanges, said sealing means on said blades comprising substantially T-shaped cross-section elastomeric sealing strips fixedly attached to each of said blades, said flanges cooperating in sealing relationship with said sealing strips.

3. A spacer as claimed in claim 1 in which the substantially radially extending wall means extend to the said axially opposite ends of the spacer.

4. A spacer as claimed in claim 1 in which the substantially radially extending wall means comprise two angularly spaced apart substantially radially extending wall members each of which extends to both ends of the spacer.

5. A spacer as claimed in claim 4 in which the substantially radially extending wall members are circumferentially spaced apart between the axially opposite ends of the spacer.

6. A spacer as claimed in claim 1 in which the circumferentially extending wall members are formed, at least in part, of material whose tensile strength is substantially greater than that of the radially extending wall means.

7. A spacer as claimed in claim 6 in which the radially extending wall means is formed of a first material, and the circumferentially extending wall members is formed of alternate layers of said first material and of a second material whose tensile strength is greater than the first material.

8. A spacer as claimed in claim 7 and in which the first material is a glass reinforced plastics material, the second material being a carbonaceous material.

9. A spacer as claimed in claim 1 which is provided with an aperture within which there may be disposed a retaining member adapted to be received by disc structure of the fluid flow machine whereby the spacer may be connected to said disc structure.

10. A spacer as claimed in claim 9 in which both said radially inner and said radially outer wall members are apertured, a generally tubular member being mounted in the apertures in said wall members, said generally tubular member having a bore provided with abutment means adapted to abut said retaining member.

11. A spacer as claimed in claim 10 in which said radially outer wall is retained against radially outward movement by flange means on said generally tubular member.

* * * * *

UNITED STATES PATENT OFFICE
CERTIFICATE OF CORRECTION

Patent No. 3,712,757      Dated January 23, 1973

Inventor(s) John Robert GOODWIN

It is certified that error appears in the above-identified patent and that said Letters Patent are hereby corrected as shown below:

In the above-identified patent please add the following to the front page format after the information in paragraph [63]

[30] Foreign Application Priority Data
October 20, 1969  Great Britain 52747/69.

Signed and sealed this 29th day of May 1973.

(SEAL)
Attest:

EDWARD M. FLETCHER, JR.
Attesting Officer

ROBERT GOTTSCHALK
Commissioner of Patents